(12) United States Patent
Sato et al.

(10) Patent No.: US 7,074,270 B2
(45) Date of Patent: Jul. 11, 2006

(54) METHOD FOR PREDICTING THE BEHAVIOR OF DOPANT AND DEFECT COMPONENTS

(75) Inventors: Yuzuru Sato, Suwa (JP); Masamitsu Uehara, Suwa (JP); Gyeong S. Hwang, Austin, TX (US); William A. Goddard, III, Pasadena, CA (US)

(73) Assignees: Seiko Epson Corporation, Tokyo (JP); California Institute of Technology, Pasadena, CA (US)

( * ) Notice: Subject to any disclaimer, the term of this patent is extended or adjusted under 35 U.S.C. 154(b) by 321 days.

(21) Appl. No.: 10/406,033

(22) Filed: Apr. 2, 2003

(65) Prior Publication Data

US 2005/0054197 A1    Mar. 10, 2005

(51) Int. Cl.
*C30B 1/00*    (2006.01)
(52) U.S. Cl. .................... 117/3; 117/4; 117/19; 117/55; 117/85; 117/89
(58) Field of Classification Search .................... 117/3, 117/4, 19, 55, 85, 86; 700/90, 95
See application file for complete search history.

(56) References Cited

U.S. PATENT DOCUMENTS

2002/0188373 A1    12/2002    Goddard, III et al.

OTHER PUBLICATIONS

"A simple continuum model for boron clustering based on atomistic calculations," S. Chakravarthi, et al., Journal of Applied Physics, vol. 89, No. 7, Apr. 1, 2001, pp. 3650-3655.

*Primary Examiner*—Robert Kunemund
(74) *Attorney, Agent, or Firm*—Michael T. Gabrik

(57) ABSTRACT

Techniques for predicting the behavior of dopant and defect components in a substrate lattice formed from a substrate material can be implemented in hardware or software. Fundamental data for a set of microscopic processes that can occur during one or more material processing operations is obtained. Such data can include data representing the kinetics of processes in the set of microscopic processes and the energetics and structure of possible states in the material processing operations. From the fundamental data and a set of external conditions, distributions of dopant and defect components in the substrate lattice are predicted. The distributions of one or more fast components are each predicted by calculating the concentration of the particular fast component for a time period before that fast component reaches its pseudo steady state by solving a first relationship and calculating the concentration of that fast component after the time period by solving a second relationship based on other components, the pseudo steady state of a fast component being a state in which the concentration of that fast component is determined by concentrations of other components. The distribution of $Bs_3Bi$, in addition to the distributions of Bs, BsI, $BsI_2$, $BsI_3$, BsBi, $BsBi_2$, $BsBi_3$, BsBiI, $BsBiI_2$, $Bs_2Bi$, $Bs_2Bi_2$, I and $I_n$, are calculated by solving the first relationship to predict the distribution of boron after annealing, where Bs and Bi represent substitutional boron and interstitial boron, respectively, and I and $I_n$ represent interstitial silicon and a cluster of n I's, respectively.

8 Claims, 6 Drawing Sheets

US 7,074,270 B2

METHOD FOR PREDICTING THE BEHAVIOR OF DOPANT AND DEFECT COMPONENTS

RELATED APPLICATION DATA

This application is related to application Ser. No. 10/113,919 (Pub. No. 2002/0188373 A1) filed on Mar. 28, 2002 in the names of William A. Goddard III and Gyeong S. Hwang. The contents of this related application is incorporated by reference herein.

BACKGROUND OF THE INVENTION

1. Field of the Invention

The invention relates to semiconductor processing and the prediction of structures and properties resulting from processes used in the preparation and modification of semiconductor materials. The prediction can be embodied in methods which can be implemented in hardware or software.

2. Description of the Related Art

In order to maximize the performance and value of electronic devices including memories, central processor units (CPUs), transmitters and detectors of electromagnetic and sonic radiation, and other components of electronic computers, it is important to reduce the size, noise, and reproducibility while increasing the speed of the devices. This requires growing complex heterostructures in which various dopants are introduced into precise locations and processed to obtain desired distributions, electrical activity, and other properties useful in devices. To optimize the performance of these devices, it is necessary to model and simulate the electrical and mechanical properties resulting from various distributions and clustering of the dopants, oxidation-products, and impurities. With previous technologies, modeling and simulation techniques have generally treated the materials as a macroscopic continuum, with continuous variations in concentrations of dopants, and have used finite element analysis to describe the diffusion and operation of the devices.

In future generations of devices, the size of device elements (for example the gate of a field effect transistor (FET)) will be in the range of less than 100 nm, a size range at which it will be important to consider the atomistic characteristics of the materials, rather than just their macroscopic continuum properties. For example, to make a p-type silicon FET with a gate less than 100 nm, it is useful to carry out ultra-shallow ion implantation deposition of boron, using low energies (e.g., 1 keV) that limit the boron to a region within a short distance (e.g., 20 nm) from the surface. It is useful to deposit sufficiently high boron surface concentrations (e.g., $5\times10^{20}$) near the surface to obtain sufficient activity of dopants for optimum performance. However, it is found that such conditions may lead to a clustering of the dopants and other defects (vacancies and interstitials) and to long-range diffusion tails that degrade the performance, whereas it is desired to maintain the boron near the surface while unclustered in a substitutional site that maximizes performance. In addition, it is possible that too much of the boron near the surface may diffuse to the interface, resulting in a kink or non-optimum distribution in the boron distribution. Also, much of the boron may not have the proper electrical activity (as a low energy acceptor level) due to clustering or association with a non-optimum site. These examples consider boron because there are serious problems today involving such systems; however, similar problems can occur for other dopants.

In order to develop the highest performance devices, it is important to accurately predict such properties, that is, to predict the distributions of the dopants and defects (e.g., vacancies, interstitials) as a function of depositing conditions and subsequent heat treatments (e.g., annealing), oxidation, exposure to other impurities or dopants, changes in external conditions (pressure, stress, voltage, magnetic fields, electromagnetic radiation, ultrasonic radiation, etc.). In addition, it is important to predict the electrical activity and other device properties resulting from the deposition and processing of such systems. Also, it is important to predict the critical voltages and fields for electrical or mechanical breakdown of such systems. It is also important to predict the effects of aging (repeated cycling of voltages, stresses, temperature, and exposure to radiation, oxygen, water, and other molecules).

OBJECT OF THE INVENTION

It is therefore an object of this invention to provide a method that is able to predict the behavior of dopant and defect components in a substrate lattice formed from a substrate material in order to develop higher performance in electronic devices.

SUMMARY OF THE INVENTION

The invention provides computational techniques for predicting from first principles the structures and properties of electronic materials as a function of processing. These techniques can include quantum mechanics (QM), development of force fields (FF) from QM or experiment, molecular dynamics (MD) using such FF or using QM, continuum mechanics based on parameters extracted from MD and elsewhere, and, preferably, combinations of two or more of these. QM calculations can be used to predict the electronic states and structures of the materials likely to be constructed for various processing conditions of interest. This includes various dopants (e.g., B or P), impurities (e.g., H and O) and defects (e.g., vacancies and interstitials) that might result from the synthesis and processing of the materials. QM can provide information on the rates of diffusion of the various impurities and defects and of formation of clusters and other structures. Using MD techniques, fundamental rate parameter data from such QM calculations or other sources can be used to estimate rates of processes such as diffusion, association and dissociation for collective systems (which can include, e.g., microscopic, mesoscopic and macroscopic systems) that contain distributions of several or many kinds of defects and/or impurities. Finally, using continuum mechanics, this data and the fundamental data (e.g., from quantum mechanical and MD calculations), can be used to predict the distributions of dopant and defect structures and clusters as a function of external conditions.

In general, the invention provides methods, apparatuses, and programs embodied on computer-readable mediums, implementing techniques for predicting the behavior of dopant and defect components in a substrate lattice formed from a substrate material. The techniques include obtaining fundamental data for a set of microscopic processes that can occur during one or more material processing operations, and predicting the distributions of dopant and defect components in the substrate lattice based on the fundamental data and a set of external conditions. The fundamental data includes data representing the kinetics of processes in the set of microscopic processes and the energetics and structure of possible states in the material processing operations.

The defect components can include Bs, BsBi, BsBiI$_2$, Bs$_2$Bi, Bs$_3$Bi, Bs$_2$Bi$_2$, BsBiI, BsBi$_2$, BsBiI, BsBi$_2$, BsBi$_3$, BsI, BsI$_2$, BsI$_3$, I and I$_n$, where Bs and Bi represent substitutional B and interstitial B, respectively, and I and I$_n$ represent interstitial Si and a cluster of n I's, respectively. The distribution of each component is predicted by solving the first relationship. The diffusion profile of B can be obtained by summing up the concentration of each component involving B at each depth.

In order to accelerate the calculation, each of these components can be classified into one of three groups, where the method to calculate the distributions of the components differ from group to group. In general, a slow component that has a lower diffusivity or a lower dissociation rate belongs to a first group which includes Bs, BsBi, BsBiI$_2$, Bs$_2$Bi, Bs$_3$Bi, Bs$_2$Bi$_2$, and I$_n$, and a fast component that has a higher diffusivity or a higher dissociation rate belongs to a second or third group. The second group includes I, BsBiI, BsBi$_2$ and BsBi$_3$, and the third group includes BsI, BsI$_2$ and BsI$_3$.

The distribution of each component that belongs to the first group is predicted by solving the first relationship. Each of the components that belong to the second group is predicted by solving the second relationship. The distribution of each component that belongs to the third group is predicted by solving the first relationship for a time period before the component reaches its pseudo steady state and by solving the second relationship after that time period. The pseudo steady state of a component is a state in which the concentration of that component can be determined by concentrations of other components. The higher the diffusivity or the dissociation rate is, the shorter the duration of the time period is.

The first relationship can be solved with a time step determined based on the diffusivity and the dissociation rate of the fast component. The first relationship can be an equation of the following form:

$$\frac{\partial C_k}{\partial t} = \nabla(D_k \nabla C_k) + K_{R,ij}C_iC_j + K_{D,m}C_m - K_{R,kl}C_kC_l - K_{D,k}C_k$$

where $D_k$ and $C_k$ are the diffusivity and the concentration of component k, respectively. In this equation, the first term on the right-hand side represents diffusion of the component k; the second and third terms represent generation of the component k by i+j clustering (i+j→k) and m dissociation (m→k+l), respectively; and the fourth and fifth terms represent destruction of the component k by (k+l→m) and (k→i+j) respectively. The clustering and dissociation coefficients, or rates, are given by:

$$K_{R,ij} = 4\pi R_p(D_i + D_j)$$

$$K_{D,k} = A_1 \exp(-E_{d,k}/k_B T)$$

where $R_p$ is the capture radius (~5×10$^{22}$ cm$^{-3}$), $A_1$ is a prefactor, $E_{d,k} = E_{b,k} + E_{m,i} + E_{m,j}$, $E_{b,k}$ is the binding energy of component k (=i+j), $E_{m,i}$ and $E_{m,j}$ are the diffusion energy barriers of components i and j respectively, $k_B$ is the Boltzmann constant, and T is the substrate temperature. The prefactor $A_1$ can be proportional to the concentration of lattice sites in the substrate lattice. $E_{d,k}$ can be regarded as the dissociation energy of component k into i+j. The second relationship can be given by the following equation:

$$\nabla(D_k \nabla C_k) + K_{R,ij}C_iC_j + K_{D,m}C_m - K_{R,kl}C_kC_l - K_{D,k}C_k = 0$$

The microscopic processes can include, for example, diffusion, clustering and dissociation of dopant and/or defect components in the substrate lattice. The fundamental data can include, for example, data representing the dissociation rate of defect components, the diffusivity of mobile species and the binding energy of clusters. The set of external conditions can include initial concentrations for each dopant and defect component, and an initial temperature. The material processing operations can include, for example, heat treatments, oxidation, exposure to impurities, or changes in pressure, stress, voltage, magnetic fields, electromagnetic radiation or ultrasonic radiation.

The fundamental data can be calculated in a quantum mechanics calculation. The reaction information can be calculated in a kinetic Monte Carlo simulation. Predicting the distributions of dopant and defect components in the substrate lattice can include predicting a plurality of distributions of dopant and defect components in the substrate lattice for each of a plurality of different sets of external conditions.

In preferred implementations, the invention thus provides techniques for predicting the structures and properties, such as distribution and clustering of dopants and impurities, that result from implantation, annealing, and other processes for preparing and modifying materials, and for predicting the electrical activity of the system as a function of processing conditions, manufacturing, aging, and application of external fields and conditions. These techniques can be implemented to realize one or more of the following advantages. Accurate prediction of such properties as the distributions of the dopants and defects, electrical activity, critical voltages and fields for electrical or mechanical breakdown, and the effects of aging, and modeling and simulating the structures and properties of devices as a function of processing and operating conditions, can make possible the design of improved composition and processing conditions to develop improved properties, reliability and aging, while minimizing cost and failure. Using these techniques to monitor one or more device characteristics during production and to compare the monitored characteristics to predicted optima can make possible the incorporation of increased automation into control systems for operating the processes. Prediction of performance as a function of aging and operating conditions can make it possible to develop improved fault tolerant systems.

The details of various embodiments of the invention are set forth in the accompanying drawings and the description below. Other features, objects, and advantages of the invention will be apparent from the description and drawings, and from the claims.

DESCRIPTION OF THE PREFERRED EMBODIMENTS

Figure 1:
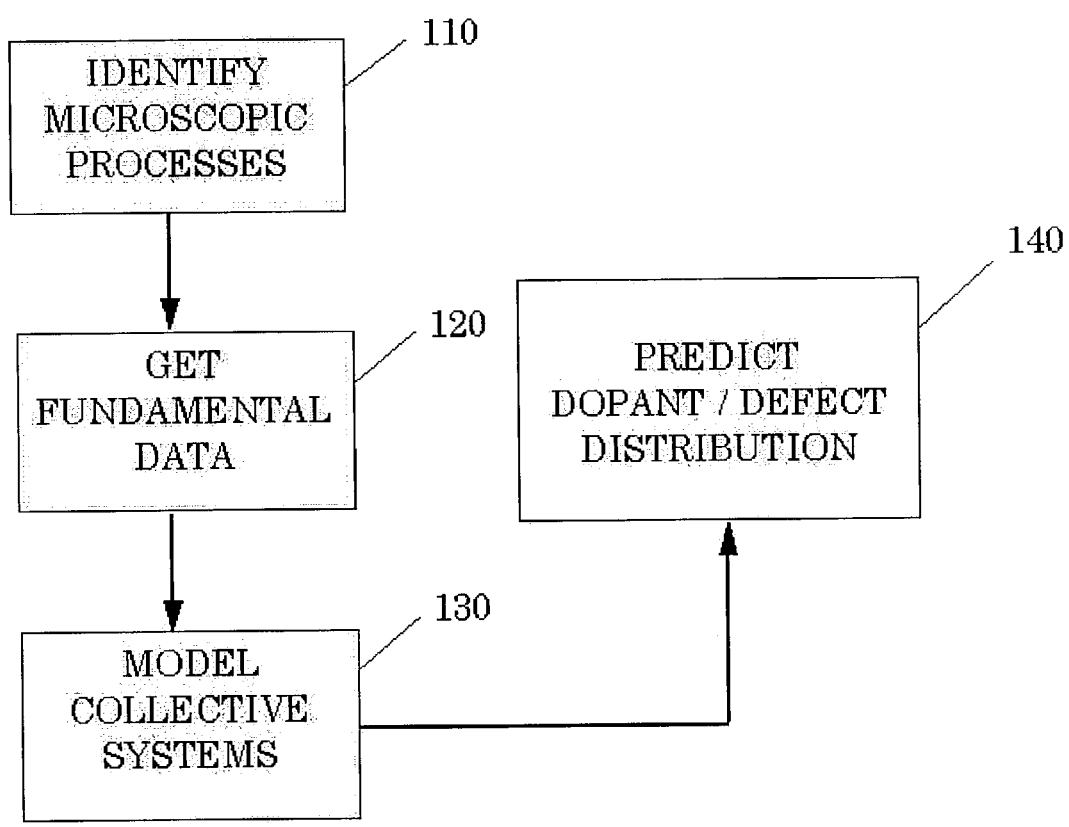
FIG. 1 is a flow diagram illustrating a general multiscale method of modeling electronic device processing according to embodiments of the invention.

A multiscale method of modeling electronic device processing is illustrated in FIG. 1. In the first step, one or more microscopic processes that may occur during a processing operation or operations are identified (step 110). Processing operations can include any conventional techniques used in the processing of electronic materials, such as the implantation of boron into a silicon lattice. The microscopic processes can include any processes that do or might occur during the operation(s), including the association of dopants, substrate atoms, and/or impurities to form clusters or complexes, the diffusion of such complexes and dopant components, the dissociation of complexes, and the like. Next, fundamental data are obtained for the microscopic processes of interest (step 120). Quantum mechanics (QM) calculations can be used in this step to predict the energetics and structures for the various states, the barriers for the various processes in which atoms and defects move from site to site, and the other data required to predict the rates of various processes such as diffusion, association and dissociation. This can be done by calculating the relative energy of the various stable structures and the activation energies and entropies for the various dynamic and kinetic processes that connect the various sites.

Fundamental rate parameter data, obtained in step 120 from QM calculations or from molecular dynamics (MD) calculations or elsewhere, are used to model the characteristics of collective systems incorporating distributions of several or many kinds of defects and impurities using molecular dynamics (step 130).

In one implementation, these calculations are performed using kinetic Monte Carlo (kMC) dynamics. The kMC simulation provides information about the long-term consequences of defect/dopant reactions, indicating which clusters constitute major components and identifying the important reaction pathways.

The fundamental data (e.g., data from the QM calculations in step 120) and reaction information (e.g., information from the kMC dynamics calculations in step 130) are used to predict the distributions of dopant and defect components and clusters (step 140). Equilibrium and non-equilibrium distributions of these components are predicted as a function of initial concentrations, temperature, and other external conditions (e.g., stress, voltage, magnetic fields, electromagnetic fields, temperature profiles, external radiation). The predicted distributions are solved as a function of time and processing conditions with a hierarchy of methods that in addition to the atomistic approaches (QM, MD) mentioned above may involve partial differential equations using finite elements and continuum approaches along with atomistic conditions.

Processing operations can involve many components, including dopants, defects and clusters or complexes as discussed above, the concentrations of which at a given time can be interdependent. Thus, for example, ion implantation of boron in a silicon lattice creates many species, including substitutional and interstitial boron atoms, interstitial silicon atoms, vacancies, and clusters of various numbers of boron and silicon atoms. Some of these species, referred to here as fast species or components, can have very high diffusivity or dissociation rates (which can be estimated according to the diffusion energy barrier and binding energy, respectively), such that the local concentration of these species will vary significantly with time as they either diffuse away or dissociate into other components.

As the system evolves in time, some fast processes may achieve a steady state in which the relative concentrations are nearly constant with time with only the overall population changing slowly with time. In such circumstances the atomistic dynamics may be replaced with a constitutive equation whose parameters are determined from the atomistic equations. This can allow the longer time phenomena to be described in terms of a mesoscopic or continuum equation, greatly extending the time and length scales that are practical.

Thus, the concentration of fast species can be described as follows:

$$\frac{\partial C_k}{\partial t} = \nabla (D_k \nabla C_k) + K_{R,ij} C_i C_j + K_{D,m} C_m - K_{R,kl} C_k C_l - K_{D,k} C_k \quad (1)$$

where $D_k$ and $C_k$ are the diffusivity and the concentration of a component k, respectively. The temperature dependence of the diffusivity can be written as $$D_k = A_2 \exp(-E_{m,k}/k_B T) \quad (2)$$

where $A_2$ is a prefactor, $E_{m,k}$ is the diffusion energy barrier, $k_B$ is the Boltzmann constant, and T is the substrate temperature. The clustering and dissociation coefficients, or rates, are given by $$K_{R,ij} = 4\pi R_p (D_i + D_j) \quad (3)$$

$$K_{D,k} = A_1 \exp(-E_{d,k}/k_B T) \quad (4)$$

where $R_p$ is the capture radius ($\sim 5 \times 10^{22}$ cm$^{-3}$), $A_1$ is a prefactor, $E_{d,k} = E_{b,k} + E_{m,i} + E_{m,j}$, $E_{b,k}$ is the binding energy of component k (=i+j), $E_{m,i}$ is the diffusion energy barrier of component i, $k_B$ is the Boltzmann constant, and T is the substrate temperature. The prefactor $A_1$ can be proportional to the concentration of lattice sites in the substrate lattice. $E_{d,k}$ can be regarded as the dissociation energy of component k into i+j. In equation (1), the first term on the right-hand side represents diffusion; the second and third terms represent generation by i+j clustering (i+j→k) and m dissociation (m→k+1), respectively. The k component can be removed from the process according to the reverse processes, as described by the fourth (k+1→m) and the fifth (k→i+j) terms.

At the onset of a process such as annealing the fast components are far from thermal equilibrium with other slowly varying species (i.e., so-called "slow" components, or species that have a large binding energy or low diffusivity). To describe the dynamics of these fast components, the partial differential equation set out above must be solved using a very small time step (which can be estimated as at least an order of magnitude or more smaller than the lowest simulation time scale, which, in turn, can be approximated by $\Delta x^2/D$ or 1kd, where $\Delta x$ represents the mesh size of the simulation. Thus, for example, at 1000° C., a time step on the order of $10^{-12}$ sec may be required for describing the dynamics of single Si interstitials, Bs-I pairs or vacancies in the silicon lattice. To describe the concentration decay of such components using such small time steps can be computationally intensive for typical simulation time scales of larger than 1 sec, such that a typical simulation involving a significant number of fast components can take hours or more of computation time.

Computation times can be significantly reduced, however, by recognizing that the fast components typically reach thermal equilibrium with slow components, a so-called pseudo steady state in which their concentrations are essentially determined by those of the slow components. At this stage, the concentration of the fast components thus can be determined by solving an ordinary differential equation:

$$\nabla(D_k \nabla C_k) + K_{R,ij} C_i C_j + K_{D,m} C_m - K_{R,kl} C_k C_l - K_{D,k} C_k = 0 \qquad (5)$$

That is, at times before the pseudo steady state is reached for a given fast component, the concentration variation of that fast component is described by solving a partial differential equation with a small time step as described above, whereas once the fast component arrives at the pseudo steady state its concentration can be determined by solving an ordinary differential equation that involves slowly varying components.

At this stage the time step can be adjusted to fit the next fastest component (e.g., according to the diffusivities and the dissociation rates of the next fastest components). By decoupling the fast components reaching a pseudo steady state, the time step can be continuously increased. By contrast, the concentrations of slow components are determined simply by solving the relevant partial differential equation with an appropriate time step, which should be significantly larger due to the larger binding energies and lower diffusivities of these species and therefore not as computationally intensive as for the fast components.

In this way, the computational time can be substantially reduced, which in turn allows a computationally efficient (cost-effective) determination and prediction of non-equilibrium processes that may involve time scales ranging from picoseconds to minutes. Furthermore such computational efficiency opens the door to large-scale two- and three-dimensional simulations indispensable for optimizing processing conditions of actual devices.

EXAMPLE

Figure 2:
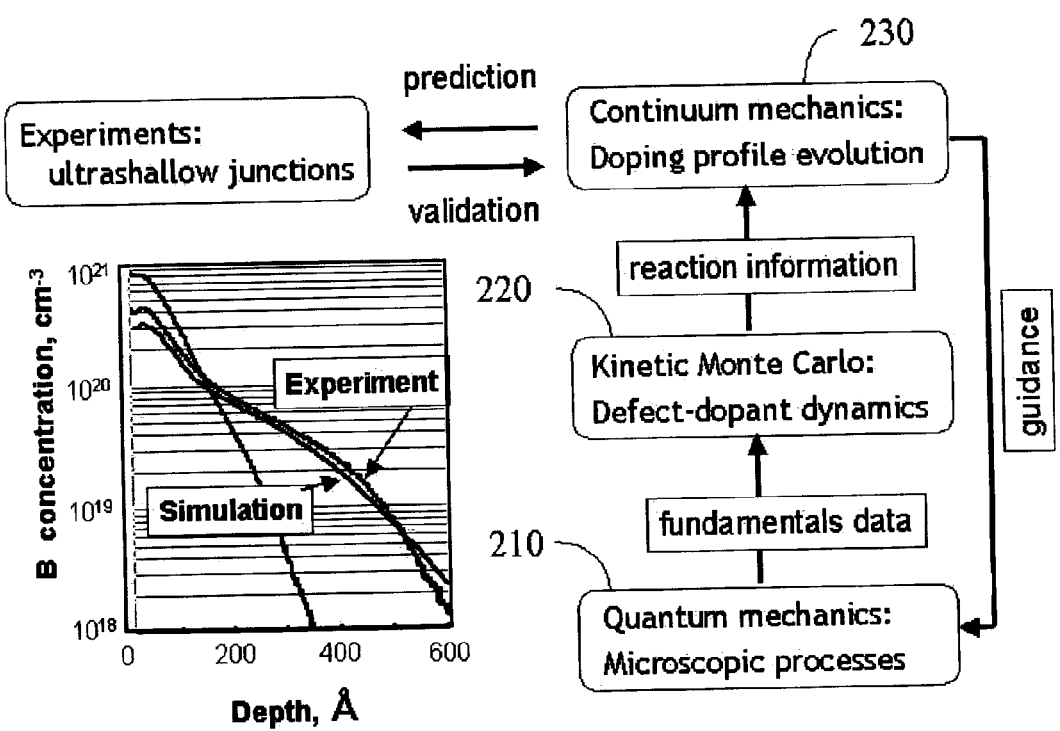
FIG. 2 illustrates the application of a multiscale modeling method of ultra shallow junction processing.

The following example considers the possible distributions of boron, silicon, and vacancies at various substitutional and interstitial sites, including clusters of several atoms and/or defects at any one site. The application of multiscale modeling for ultra shallow junction processing is summarized in FIG. 2.

We first used quantum mechanics calculations 210 to model the relevant microscopic processes. All atomic structures were optimized using the local density approximation (LDA) to density functional theory (DFT), as implemented in the CPMD V3.3 package. Calculation of the energetics of the LDA structures using the generalized gradient approximation (GGA) gave similar results. We used a non-local, norm-conserving pseudopotential and a plane-wave cutoff energy of 20 Ry. The defect systems considered were modeled using a 192-atom supercell with a fixed volume that yields a Si—Si bond distance of 2.35 Å in pure silicon. All atomic positions were allowed to relax fully until all residual forces were smaller than $5 \times 10^{-4}$ Hartree/Bohr. Because of the large supercell, we use just one k-point at $\Gamma$ for the Brillouin-zone (BZ) integrations. Of course the details (e.g., number of k points) may be different for other systems. Generally one considers a range of such parameters for prototype systems to choose the parameters providing acceptable accuracy at acceptable costs. As described above many computational programs are available for such detailed QM calculations.

Such methods (QM, MD, etc.) are used first to elicit an improved understanding of defect-defect and defect-dopant interactions, which is essential for developing a comprehensive model of junction processing. In particular, for the example under consideration here we needed to understand how boron doping for ultra shallow p-type junctions in silicon brings about many complex diffusion phenomena associated with boron-boron and boron-silicon interstitial clustering. Since ultra shallow junction fabrication requires a very high doping level (e.g., $>10^{20}$ cm$^{-3}$) such clustering may be unavoidable. Since silicon clusters are known to be a main source for single silicon interstitials that are primarily responsible for the transient enhanced diffusion (TED) of boron, it is essential to develop a concrete model for the formation of silicon interstitial clusters during implantation and at the onset of annealing. We have shown that QM calculations (implementing density functional theory) are able to identify the key fundamental processes. Such studies are an essential part of our method.

Next, referring again to FIG. 2, kMC molecular dynamics simulations 220 were used to describe dopant diffusion and defect-dopant interactions. In these calculations, the locations of defect, dopant, and clusters can be traced as a function of time for time scales of multiscale simulations ranging from $10^{-12}$ sec to $10^2$ sec, all in one simulation on one processor in a few minutes. All entities are treated as point-like particles with basic attributes of diffusivity and dissociation rate. We based the data for these kMC simulations (e.g. the temperature-dependent diffusivities of mobile species and the binding energies of clusters) mainly on ab-initio QM calculations.

We modeled the evolution of the macroscopic doping profile using continuum mechanics 230. As discussed above, the set of non-equilibrium reactions is described by equation (1).

In these simulations, it is assumed that boron exists in the form of either BsI or BsI$_2$ and that interstitial Si atoms exist in the form of I$_3$, at the onset of annealing. The following equations define the initial condition:

$$C_{BsI}(x) = 0.5 \times C_B(x)$$

$$C_{BsI2}(x) = 0.5 \times C_B(x)$$

$$C_{I3}(x) = 0.2 \times C_{BsI}(x) \text{ or } 0.1 \times C_B(x)$$

Here $C_B(x)$ is the concentration of boron atoms at depth x. The capture radius $[R_p]$ is set to be $2.5 \times 10^{-8}$ cm.

Interstitial silicon atom (I), Bs, BsI pairs, and BsBi pairs are allowed to diffuse. The diffusion rate of each component is listed below:

I: 0.005 exp(−0.4 eV/k$_B$T), Bs: 0.1 exp(−3.46 eV/k$_B$T),

BsI: 0.001 exp(−0.68 eV/k$_B$T), BsBi: 2.5 exp (−2.45 eV/k$_B$T) cm$^2$/sec.

The dissociation rates of defect-dopant complexes are estimated as shown below:

BsI: $10^{13}$ exp(−(E$_{b,BsI}$+0.4) eV/k$_B$T), BsI$_2$: $10^{13}$ exp(−1.9 eV/k$_B$T), BsI$_3$: $10^{13}$ exp(−1.9 eV/k$_B$T), BsBi: $5 \times 10^{13}$ exp(−2.18 eV/k$_B$T), BsBi$_2$: $10^{13}$ exp(−1.6 eV/k$_B$T), BsBi$_3$: $10^{13}$ exp(−1.6 eV/k$_B$T), BsBiI: $10^{13}$ exp(−1.1 eV/k$_B$T), BsBiI$_2$: $10^{13}$ exp(−2.2 eV/k$_B$T), Bs$_2$Bi: $6 \times 10^{16}$ exp(−4.46 eV/k$_B$T), Bs$_2$Bi$_2$a: Pfa×$10^{13}$ exp(−(E$_{b,Bs2Bi2a}$+Em,I)eV/k$_B$T), Bs$_2$Bi$_2$b: (1.0−Pfa)×$10^{13}$ exp(−(E$_{b,Bs2Bi2b}$+E$_{m,BsI}$)eV/k$_B$T), Bs$_3$Bi: $10^{13}$ exp(−2.46 eV/k$_B$T) sec$^{-1}$, where $Pfa=(1.0+\exp[\{E_{b,Bs2Bi2a}+E_{m,I}-E_{b,Bs2Bi2b}-E_{m,BsI}\}/k_BT])^{-1}$, $E_{b,Bs2Bi2a}$=3.0: the binding energy of I in the cluster $Bs_2Bi_2$, $E_{b,Bs2Bi2b}$=2.0: the binding energy of BsI in the cluster $Bs_2Bi_2$, $E_{m,I}$=0.4: the diffusion energy barrier of I, $E_{m,BsI}$=0.68: the diffusion energy barrier of BsI, $E_{b,BsI}$=0.62: the binding energy of I for implantation energy of 200 eV, $E_{b,BsI}$=0.65: the binding energy of I for implantation energy of 500 eV, $E_{b,BsI}$=0.75: the binding energy of I for implantation energy of 1000 eV, T is the temperature(K) of the substrate.

As discussed above, the algorithm used to describe macroscopic doping profile evolution while taking into account fast microscopic processes (diffusion, clustering, dissociation) incorporates the concept of a pseudo steady state for defect and dopant components whose concentration varies very rapidly with time. At the onset of high-temperature annealing there may be a large number (far beyond equilibrium) of fast components such as Si self-interstitials, vacancies, and Bs-I pairs that have either high diffusivity or high dissociation rate. To describe the concentration decay of such components requires a very small time step. For example, at 1000° C., typically a time step of $10^{-12}$ sec is required for describing the dynamics of single Si interstitials and vacancies. Also the high dissociation rate of BsI pairs (=$10^9$ sec$^{-1}$) requires a small time step (of far less than $10^{-9}$ sec) to calculate the BsI concentration variation. The time step must be decreased further as the annealing temperature increases. Within $10^{-9}$ to (at most) $10^{-6}$ sec, however, the so-called fast components reach a pseudo steady state in which their concentrations are determined by other slowly varying components. That is, before the pseudo steady state the concentration variation of such fast components is described by solving a partial differential equation (1) with a small time step (preferably smaller than $\Delta x^2/Di$ and $1/K_{d,i}$, where $\Delta x$ is a mesh size, $D_i$ and $K_{d,i}$ are the diffusivity and the dissociation rate of the fast components); e.g., for BsI:

$$\frac{dC_{BsI}}{dt} = -D_{BsI}\frac{d^2C_{BsI}}{dx^2} + G_{BsI} - L_{BsI}$$

where $G_{BsI}=D_IR_pC_IC_{Bs}+K_{d,BsI2}C_{BsI2}+K_{d,BsBi}C_{BsBi}+K_{d,Bs2Bi2}C_{Bs2Bi2}$, and $L_{BsI}=D_IR_pC_IC_{BsI}+D_{BsI}R_pC_{BsI}(C_{Bs}+C_{BsBi}+C_{BsBi2}+C_{BsI}+C_{BsI2}+C_{Bs2Bi})+K_{d,BsI}C_{BsI}$. Here, $C_i$, $D_i$, and $K_{d,i}$ are the concentration, the diffusivity, and the dissociation coefficient of species i. However, once the fast components arrive at the pseudo steady state their concentrations are determined by solving an ordinary differential equation (5) that involves slowly varying components; e.g., for BsI:

$$0 = -D_{BsI}\frac{d^2C_{BsI}}{dx^2} + G_{BsI} - L_{BsI}$$

At this stage, the time step can be adjusted to fit the next fastest component (e.g., according to the diffusivities and the dissociation rates of the next fastest components). By decoupling the fast components reaching a pseudo steady state, the time step can be continuously increased.

Figure 3:
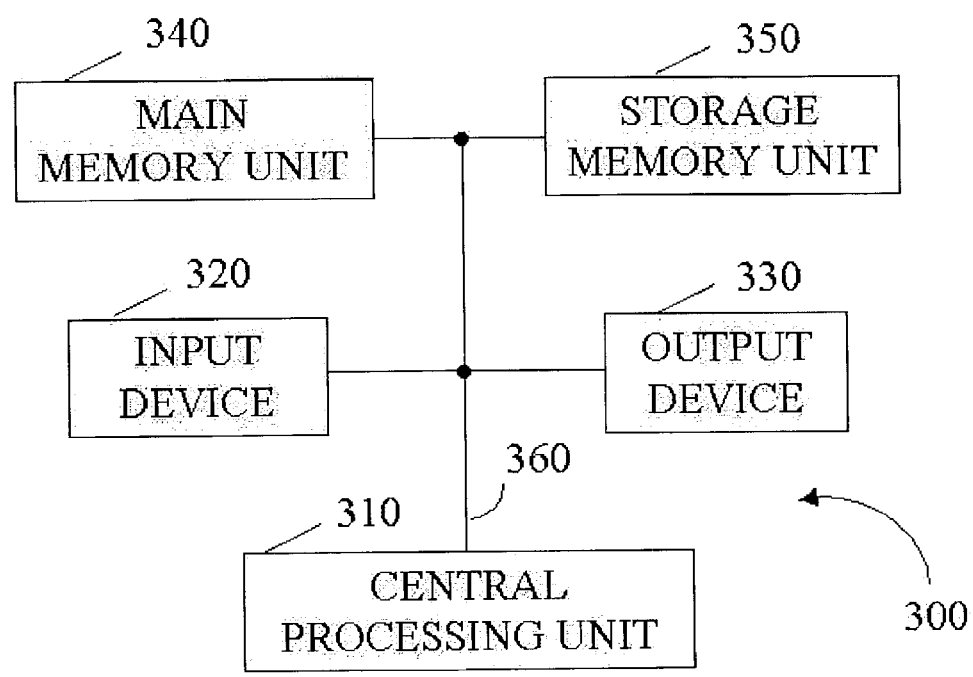
FIG. 3 is a functional block diagram of a computer-implemented system for carrying out various aspects of the method for predicting the distribution of boron after annealing according to embodiments of the present invention.

The invention can be implemented in digital electronic circuitry, or in computer hardware, firmware, software, or in combinations of them. An apparatus of the invention may be implemented in a computer program product tangibly embodied in a machine-readable storage device or medium for execution by a programmable processor. Referring now to FIG. 3, there is shown a functional block diagram of an embodiment of a computer-implemented system 300 suitable for carrying out various functions of the present invention. The computer-implemented system 300 includes a central processing unit (CPU) 310, an input device 320, an output device 330, a main memory unit 340, and a storage memory unit 350, and a multi-bit bus 360. Hardware components of the computer-implemented system 300 beneficially may have a variety of designs. For example, the CPU 310 can be a compatible microprocessor, such as a Pentium microprocessor commercially available from Intel Corporation of Santa Clara, Calif. The CPU 310 preferably includes a floating-point math coprocessor to increase performance speed on various calculations performed in accordance with the method of the present invention. Suitable CPU 310 includes, by way of example, both general and special purpose microprocessors. The input device 320 can be any suitable device for supplying information to the CPU 310, such as a conventional keyboard or mouse. The output device 330 can be, for example, a conventional cathode ray tube (CRT) monitor or a printer. The main and storage memory units 340, 350 are machine-readable media capable of being read by the CPU 310, and may be of conventional design. For example, the main memory unit 340 can be a dynamic random access memory unit (DRAM) or a static random access memory unit (SRAM). The storage memory unit 350 stores a program of instruction which is capable of directing the CPU 310 to perform functions of the present invention. Generally, a computer will include one or more storage memory units 350 for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Computer program instructions and data for performing functions of the present invention may also be embodied in a suitable electromagnetic carrier wave. The multi-bit bus 360 can be of conventional design. Interconnection of hardware components of the computer-implemented system 300 by multi-bit bus 360 is achieved in a conventional manner.

Method steps of the invention can be performed by the CPU 310 executing a program of instructions to perform the functions of the invention by operating on input data and generating output. The invention can be implemented advantageously in one or more computer programs that are executable on a programmable system including at least one programmable CPU 310 coupled to receive data and instructions from, and to transmit data and instructions to, the storage memory unit 350, at least one input device 320, and at least one output device 330. Each computer program can be implemented in a high-level procedural or object-oriented programming language, or in assembly or machine language if desired; and in any case, the language can be a compiled or interpreted language. Generally, the CPU 310 will receive instructions and data from the storage memory unit 350 and/or the main memory unit 340. Any of the foregoing may be supplemented by, or incorporated in, specially-designed ASICs (Application-Specific Integrated Circuits).

Embodiment 1

Figure 4:
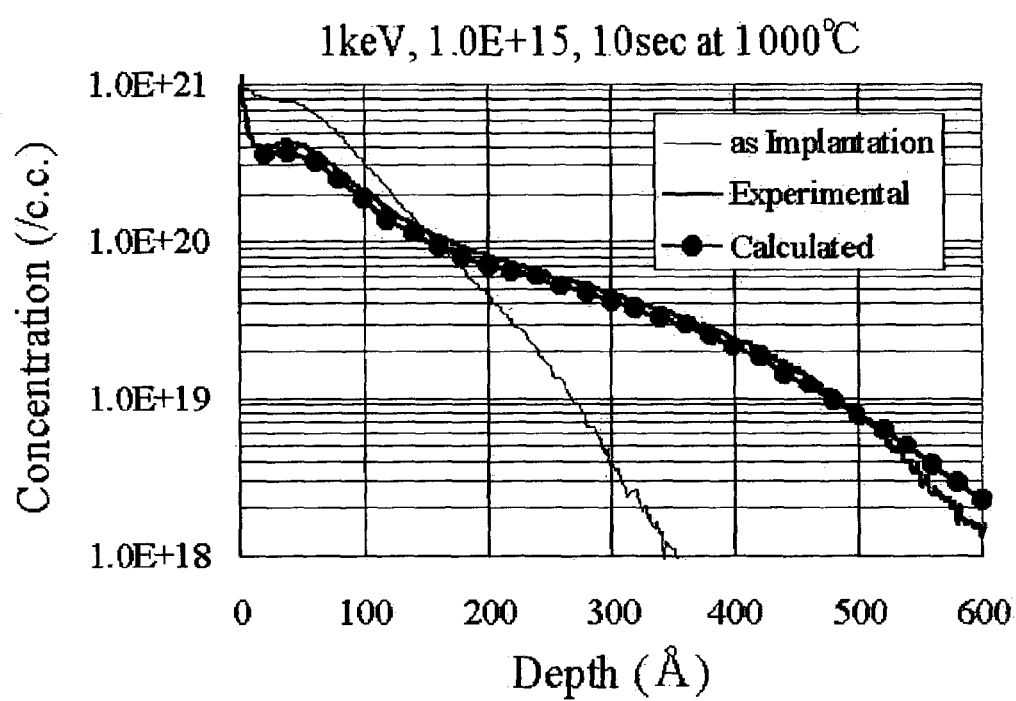
FIG. 4 illustrates a first embodiment of the invention.

FIG. 4 shows the first example. In this example, boron atoms were implanted on a silicon wafer by implantation energy of 1 keV, and the wafer was annealed for 10 seconds at 1000° C. In this calculation, $E_{b,BsI}$ was set to be 0.75 eV. The distributions of Bs, BsBi, BsBiI$_2$, Bs$_2$Bi, Bs$_2$Bi$_2$, Bs$_3$Bi, and I$_n$ were calculated by solving the first relationship, Eq. (1), throughout the simulation, and the distributions of I, BsBiI, BsBi$_2$ and BsBi$_3$ were calculated by solving the second relationship, Eq. (5), throughout the simulation. On the other hand, the distribution of BsI was calculated by solving the first relationship in the time period of t≦0.1 μsec, and by solving the second relationship in the time period of t>0.1 μsec. The distributions of BsI$_2$ and BsI$_3$ were calculated by solving the first relationship in the time period of t≦0.1 msec, and by solving the second relationship in the time period of t>0.1 msec. Finally, the doping profile of boron was obtained by summing up the concentration at depth x of all of components which contain boron atoms. Experimental data obtained using SIMS measurement is also shown in FIG. 4. Calculated result is in good agreement with experiment.

Embodiment 2

Figure 5:
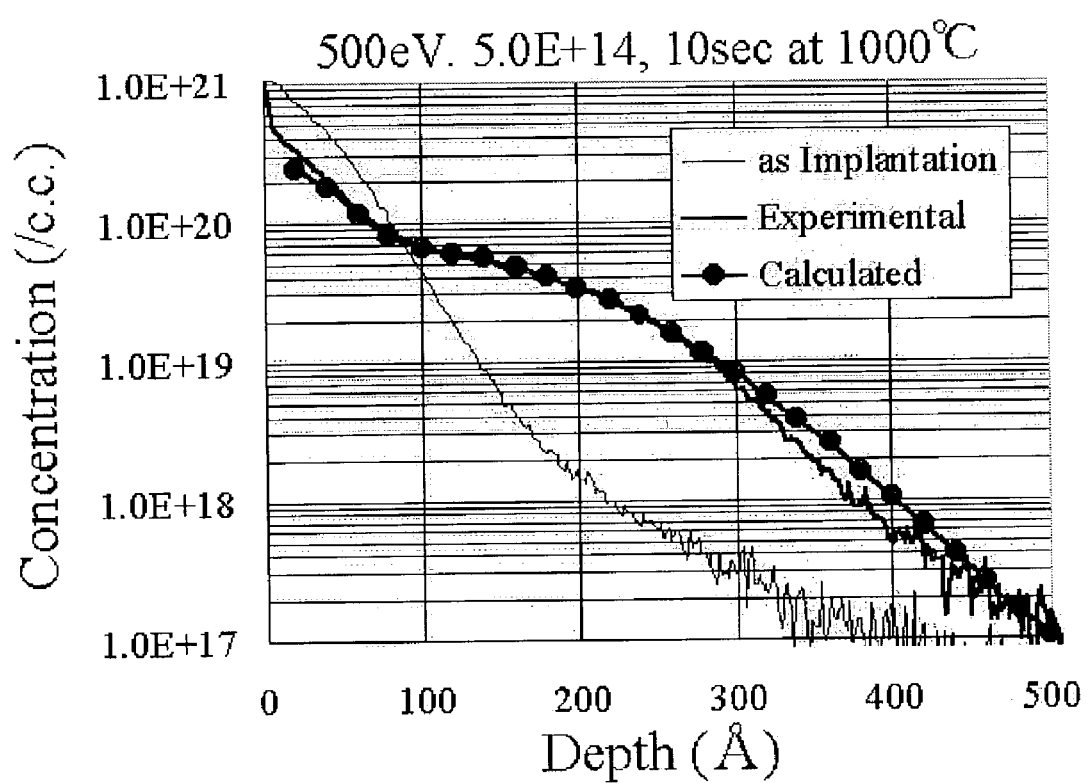
FIG. 5 illustrates a second embodiment of the invention.

FIG. 5 shows the second example. In this example, boron atoms were implanted on a silicon wafer by implantation energy of 500 eV, and the wafer was annealed for 10 seconds at 1000° C. In this calculation, $E_{b,BsI}$ was set to be 0.65 eV. The doping profile of boron was calculated in the same way as that used in Embodiment 1. Experimental data obtained using SIMS measurement is also shown in FIG. 5. Calculated result is in good agreement with experiment.

Embodiment 3

Figure 6:
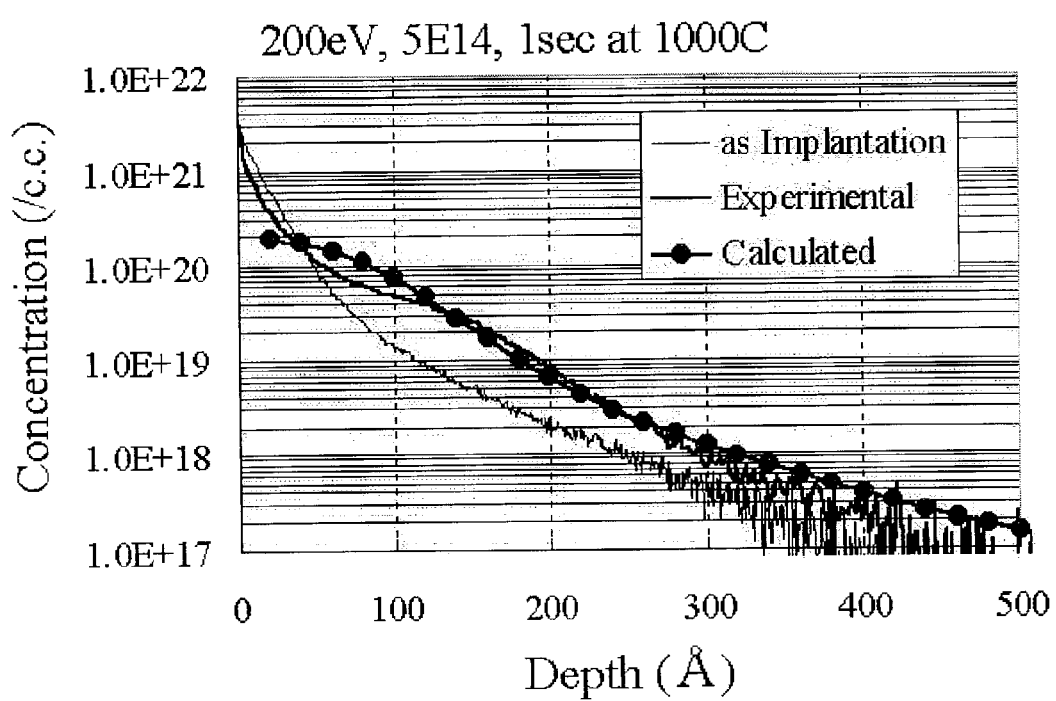
FIG. 6 illustrates a third embodiment of the invention.

FIG. 6 shows the third example. In this example, boron atoms were implanted on a silicon wafer by implantation energy of 200 eV, and the wafer was annealed for 1 seconds at 1000° C. In this calculation, $E_{b,BsI}$ was set to be 0.62 eV. The doping profile of boron was calculated in the same way as that used in Embodiment 1. Experimental data obtained using SIMS measurement is also shown in FIG. 6. Calculated result is in good agreement with experiment.

While the invention has been described in conjunction with several specific embodiments, many further alternatives, modifications, variations and applications will be apparent to those skilled in the art that in light of the foregoing description. Thus, the invention described herein is intended to embrace all such alternatives, modifications, variations and applications as may fall within the spirit and scope of the appended claims.

What is claimed is:

1. A method for predicting the behavior of dopant and defect components in a substrate lattice formed from a substrate material, the method comprising:

obtaining fundamental data for a set of microscopic processes that can occur during one or more material processing operations, the fundamental data including data representing the kinetics of processes in the set of microscopic processes and the energetics and structure of possible states in the material processing operations; and predicting distributions of dopant and defect components in the substrate lattice based on the fundamental data and a set of external conditions, wherein the distribution of each of Bs, BsBi, BsBiI$_2$, Bs$_2$Bi, Bs$_2$Bi$_2$, Bs$_3$Bi, and I$_n$ is predicted by solving a first relationship throughout the simulation, the distribution of each of I, BsBiI, BsBi$_2$ and BsBi$_3$ is predicted by solving a second relationship throughout the simulation, the distribution of BsI is predicted by solving the first relationship in a first time period and by solving the second relationship in a second time period, and the distribution of each of BsI$_2$ and BsI$_3$ is predicted by solving the first relationship in a third time period and by solving the second relationship in a fourth time period, wherein Bs and Bi represent substitutional boron and interstitial boron, respectively, and I and I$_n$ represent interstitial silicon and a cluster of n I's, respectively, wherein a component I$_3$ is added to the substrate lattice before annealing, and wherein the concentration of each of BsI, BsI$_2$ and I$_3$ at depth x before annealing is assumed to be:

$C_{BsI}(x) = 0.5 \times C_B(x)$ $C_{BsI2}(x) = 0.5 \times C_B(x)$ $C_{I3}(x) = 0.2 \times C_{BsI}(x)$ or $0.1 \times C_B(x)$, where $C_B(x)$ is the concentration of boron atoms at depth x.

2. The method of claim 1, wherein:

the first time period is the time period of t≦0.1 μsec, the second time period is the time period of t>0.1 μsec, the third time period is the time period of t≦0.1 msec, and the fourth time period is the time period of t>0.1 msec.

3. The method of claim 1, wherein:

the dissociation energy for each of BsI, BsI$_2$, BsI$_3$, BsBi$_2$, BsBi$_3$, BsBiI, BsBiI$_2$, Bs$_2$Bi$_2$a, Bs$_2$Bi$_2$b, Bs$_3$Bi is about:

BsI: $E_{b,BsI} + E_{m,I}$ where $E_{b,BsI}$ represents the binding energy of I and is either about 0.62, about 0.65, or about 0.75, corresponding to implantation energies of 200 eV, 500 eV and 1000 eV, respectively, and $E_{m,I}$ represents the diffusion energy barrier of I and is about 0.4,

| | |
|---|---|
| BsI$_2$: 1.9, | BsI$_3$: 1.9, |
| BsBi$_2$: 1.6, | BsBi$_3$: 1.6, |
| BsBiI: 1.1, | BsBiI$_2$: 2.2, |
| Bs$_2$Bi$_2$a: $E_{b, Bs2Bi2a} + E_{m, I}$, the sum of which is about 3.4, | |
| Bs$_2$Bi$_2$b: $E_{b, Bs2Bi2b} + E_{m, BsI}$, the sum of which is about 2.68, | |
| Bs$_3$Bi: 2.46; | | the prefactor for dissociation coefficient of each component is about:

| | |
|---|---|
| BsI$_2$: $1.0 \times 10^{13}$, | BsI$_3$: $1.0 \times 10^{13}$, |
| BsBi: $5.0 \times 10^{13}$, | BsBi$_2$: $1.0 \times 10^{13}$, |
| BsBi$_3$: $1.0 \times 10^{13}$, | BsBiI: $1.0 \times 10^{13}$, |
| BsBiI$_2$: $1.0 \times 10^{13}$, | Bs$_2$Bi: $6.0 \times 10^{16}$, |
| Bs$_2$Bi$_2$a: Pfa $\times 10^{13}$, | Bs$_2$Bi$_2$b: (1.0 − Pfa) $\times 10^{13}$, |
| Bs$_3$Bi: $1.0 \times 10^{13}$, | |

Pfa being determined according to $(1.0+\exp[\{E_{b,Bs2Bi2a}+E_{m,I}-E_{b,Bs2Bi2b}-E_{m,BsI}\}/k_BT])^{-1}$, where $E_{b,Bs2Bi2a}$ represents the binding energy of I in the cluster $Bs_2Bi_2$ and is about 3.0, $E_{b,Bs2Bi2b}$ represents the binding energy of BsI in the cluster $Bs_2Bi_2$ and is about 2.0, $E_{m,BsI}$ represents the diffusion energy barrier of BsI and is about 0.68, and T is the temperature(K) of the substrate;

the diffusion energy barrier of Bs is about 3.46; and the prefactor for diffusivity of Bs is about 0.1.

4. The method of claim 2, wherein:

the dissociation energy for each of BsI, $BsI_2$, $BsI_3$, $BsBi_2$, $BsBi_3$, BsBiI, $BsBiI_2$, $Bs_2Bi_2a$, $Bs_2Bi_2b$, $Bs_3Bi$ is about:

BsI: $E_{b,BsI}+E_{m,I}$ where $E_{b,BsI}$ represents the binding energy of I and is either about 0.62, about 0.65, or about 0.75, corresponding to implantation energies of 200 eV, 500 eV and 1000 eV, respectively, and $E_{m,I}$ represents the diffusion energy barrier of I and is about 0.4,

| | |
|---|---|
| $BsI_2$: 1.9, | $BsI_3$: 1.9, |
| $BsBi_2$: 1.6, | $BsBi_3$: 1.6, |
| BsBiI: 1.1, | $BsBiI_2$: 2.2, |
| $Bs_2Bi_2a$: $E_{b,\,Bs2Bi2a} + E_{m,\,I}$, the sum of which is about 3.4, | |
| $Bs_2Bi_2b$: $E_{b,\,Bs2Bi2b} + E_{m,\,BsI}$, the sum of which is about 2.68, | |
| $Bs_3Bi$: 2.46; | | the prefactor for dissociation coefficient of each component is about:

| | |
|---|---|
| $BsI_2$: $1.0 \times 10^{13}$, | $BsI_3$: $1.0 \times 10^{13}$, |
| BsBi: $5.0 \times 10^{13}$, | $BsBi_2$: $1.0 \times 10^{13}$, |
| $BsBi_3$: $1.0 \times 10^{13}$, | BsBiI: $1.0 \times 10^{13}$, |
| $BsBiI_2$: $1.0 \times 10^{13}$, | $Bs_2Bi$: $6.0 \times 10^{16}$, |
| $Bs_2Bi_2a$: Pfa $\times 10^{13}$, | $Bs_2Bi_2b$: $(1.0 - Pfa) \times 10^{13}$, |
| $Bs_3Bi$: $1.0 \times 10^{13}$, | |

Pfa being determined according to $(1.0+\exp[\{E_{b,Bs2Bi2a}+E_{m,I}-E_{b,Bs2Bi2b}-E_{m,BsI}\}/k_BT])^{-1}$, where $E_{b,Bs2Bi2a}$ represents the binding energy of I in the cluster $Bs_2Bi_2$ and is about 3.0, $E_{b,Bs2Bi2b}$ represents the binding energy of BsI in the cluster $Bs_2Bi_2$ and is about 2.0, $E_{m,BsI}$ represents the diffusion energy barrier of BsI and is about 0.68, and T is the temperature(K) of the substrate;

the diffusion energy barrier of Bs is about 3.46; and the prefactor for diffusivity of Bs is about 0.1.

5. A computer-readable medium carrying a program of instructions for directing a computer to perform a method of predicting the behavior of dopant and defect components in a substrate lattice formed from a substrate material, based on fundamental data for a set of microscopic processes that can occur during one or more material processing operations, the fundamental data including data representing the kinetics of processes in the set of microscopic processes and the energetics and structure of possible states in the material processing operations, the program of instructions comprising:

instructions for predicting distributions of dopant and defect components in the substrate lattice based on the fundamental data and a set of external conditions, wherein the distribution of each of Bs, BsBi, $BsBiI_2$, $Bs_2Bi$, $BsBi_2$, $Bs_3Bi$, and $I_n$ is predicted by solving a first relationship throughout the simulation, the distribution of each of I, BsBiI, $BsBi_2$ and $BsBi_3$ is predicted by solving a second relationship throughout the simulation, the distribution of BsI is predicted by solving the first relationship in a first time period and by solving the second relationship in a second time period, and the distribution of each of $BsI_2$ and $BsI_3$ is predicted by solving the first relationship in a third time period and by solving the second relationship in a fourth time period, wherein Bs and Bi represent substitutional boron and interstitial boron, respectively, and I and $I_n$ represent interstitial silicon and a cluster of n I's, respectively, wherein a component $I_3$ is added to the substrate lattice before annealing, and wherein the concentration of each of BsI, $BsI_2$ and $I_3$ at depth x before annealing is assumed to be:

$C_{BsI}(x)=0.5 \times C_B(x)$ $C_{BsI2}(x)=0.5 \times C_B(x)$ $C_{I3}(x)=0.2 \times C_{BsI}(x)$ or $0.1 \times C_B(x)$, where $C_B(x)$ is the concentration of boron atoms at depth x.

6. The computer-readable medium of claim 5, wherein:

the first time period is the time period of $t \leq 0.1$ μsec, the second time period is the time period of $t > 0.1$ μsec, the third time period is the time period of $t \leq 0.1$ msec, and the fourth time period is the time period of $t > 0.1$ msec.

7. The computer-readable medium of claim 5, wherein:

the dissociation energy for each of BsI, $BsI_2$, $BsI_3$, $BsBi_2$, $BsBi_3$, BsBiI, $BsBiI_2$, $Bs_2Bi_2a$, $Bs_2Bi_2b$, $Bs_3Bi$ is about:

BsI: $E_{b,BsI}+E_{m,I}$ where $E_{b,BsI}$ represents the binding energy of I and is either about 0.62, about 0.65, or about 0.75, corresponding to implantation energies of 200 eV, 500 eV and 1000 eV, respectively, and $E_{m,I}$ represents the diffusion energy barrier of I and is about 0.4,

| | |
|---|---|
| $BsI_2$: 1.9, | $BsI_3$: 1.9, |
| $BsBi_2$: 1.6, | $BsBi_3$: 1.6, |
| BsBiI: 1.1, | $BsBiI_2$: 2.2, |
| $Bs_2Bi_2a$: $E_{b,\,Bs2Bi2a} + E_{m,\,I}$, the sum of which is about 3.4, | |
| $Bs_2Bi_2b$: $E_{b,\,Bs2Bi2b} + E_{m,\,BsI}$, the sum of which is about 2.68, | |
| $Bs_3Bi$: 2.46; | | the prefactor for dissociation coefficient of each component is about:

| | |
|---|---|
| $BsI_2$: $1.0 \times 10^{13}$, | $BsI_3$: $1.0 \times 10^{13}$, |
| BsBi: $5.0 \times 10^{13}$, | $BsBi_2$: $1.0 \times 10^{13}$, |
| $BsBi_3$: $1.0 \times 10^{13}$, | BsBiI: $1.0 \times 10^{13}$, |
| $BsBiI_2$: $1.0 \times 10^{13}$, | $Bs_2Bi$: $6.0 \times 10^{16}$, |
| $Bs_2Bi_2a$: Pfa $\times 10^{13}$, | $Bs_2Bi_2b$: $(1.0 - Pfa) \times 10^{13}$, |
| $Bs_3Bi$: $1.0 \times 10^{13}$, | |

Pfa being determined according to $(1.0+\exp[\{E_{b,Bs2Bi2a}+E_{m,I}-E_{b,Bs2Bi2b}-E_{m,BsI}\}/k_BT])^{-1}$, where $E_{b,Bs2Bi2a}$ represents the binding energy of I in the cluster $Bs_2Bi_2$ and is about 3.0, $E_{b,Bs2Bi2b}$ represents the binding energy of BsI in the cluster $Bs_2Bi_2$ and is about 2.0, $E_{m,BsI}$ represents the diffusion energy barrier of BsI and is about 0.68, and T is the temperature(K) of the substrate;
the diffusion energy barrier of Bs is about 3.46; and
the prefactor for diffusivity of Bs is about 0.1.

8. The computer-readable medium of claim 6, wherein:
the dissociation energy for each of BsI, BsI$_2$, BsI$_3$, BsBi$_2$, BsBi$_3$, BsBiI, BsBiI$_2$, Bs$_2$Bi$_2$a, Bs$_2$Bi$_2$b, Bs$_3$Bi is about:

BsI: $E_{b,BsI}+E_{m,I}$ where $E_{b,BsI}$ represents the binding energy of I and is either about 0.62, about 0.65, or about 0.75, corresponding to implantation energies of 200 eV, 500 eV and 1000 eV, respectively, and $E_{m,I}$ represents the diffusion energy barrier of I and is about 0.4, BsI$_2$: 1.9,  BsI$_3$: 1.9,
BsBi$_2$: 1.6,  BsBi$_3$: 1.6,
BsBiI: 1.1,  BsBiI$_2$: 2.2,
Bs$_2$Bi$_2$a: $E_{b, Bs2Bi2a} + E_{m, I}$, the sum of which is about 3.4,
Bs$_2$Bi$_2$b: $E_{b, Bs2Bi2b} + E_{m, BsI}$, the sum of which is about 2.68,
Bs$_3$Bi: 2.46;

the prefactor for dissociation coefficient of each component is about:

BsI$_2$: $1.0 \times 10^{13}$,  BsI$_3$: $1.0 \times 10^{13}$,
BsBi: $5.0 \times 10^{13}$,  BsBi$_2$: $1.0 \times 10^{13}$,
BsBi$_3$: $1.0 \times 10^{13}$,  BsBiI: $1.0 \times 10^{13}$,
BsBiI$_2$: $1.0 \times 10^{13}$,  Bs$_2$Bi: $6.0 \times 10^{16}$,
Bs$_2$Bi$_2$a: Pfa $\times 10^{13}$,  Bs$_2$Bi$_2$b: $(1.0 - Pfa) \times 10^{13}$,
Bs$_3$Bi: $1.0 \times 10^{13}$, Pfa being determined according to $(1.0+\exp[\{E_{b,Bs2Bi2a}+E_{m,I}-E_{b,Bs2Bi2b}-E_{m,BsI}\}/k_BT])^{-1}$, where $E_{b,Bs2Bi2a}$ represents the binding energy of I in the cluster Bs$_2$Bi$_2$ and is about 3.0, $E_{b,Bs2Bi2b}$ represents the binding energy of BsI in the cluster Bs$_2$Bi$_2$ and is about 2.0, $E_{m,BsI}$ represents the diffusion energy barrier of BsI and is about 0.68, and T is the temperature(K) of the substrate;
the diffusion energy barrier of Bs is about 3.46; and
the prefactor for diffusivity of Bs is about 0.1.

* * * * *

UNITED STATES PATENT AND TRADEMARK OFFICE
CERTIFICATE OF CORRECTION

PATENT NO.       : 7,074,270 B2
APPLICATION NO.  : 10/406033
DATED            : July 11, 2006
INVENTOR(S)      : Yuzuru Sato et al.

It is certified that error appears in the above-identified patent and that said Letters Patent is hereby corrected as shown below:

Column 13.

Line 2, please change "$(1.0+\exp[\{ E_{b,Bs2Bi2a}^{30} \quad E_{m,I} - E_{b,Bs2Bi2b} - E_{m,BsI}\}/ k_B T ])^{-1}$ to --$(1.0+\exp[\{ E_{b,Bs2Bi2a} + E_{m,I} - E_{b,Bs2Bi2b} - E_{m,BsI} \}/ k_B T ])^{-1}$--.

Signed and Sealed this

Twenty-sixth Day of December, 2006

JON W. DUDAS
*Director of the United States Patent and Trademark Office*